United States Patent [19]

Shimomura et al.

[11] Patent Number: 4,796,588

[45] Date of Patent: Jan. 10, 1989

[54] FUEL CONTROL APPARATUS

[75] Inventors: Setsuhiro Shimomura; Yukinobu Nishimura, both of Himeji, Japan

[73] Assignee: Mitsubishi Denki Kabushiki Kaisha, Tokyo, Japan

[21] Appl. No.: 41,066

[22] Filed: Apr. 22, 1987

[30] Foreign Application Priority Data

Apr. 22, 1986 [JP] Japan .................................. 61-95139
Apr. 25, 1986 [JP] Japan .................................. 61-97212
Sep. 18, 1986 [JP] Japan .................................. 61-222520

[51] Int. Cl.⁴ .......................................... F02D 41/22
[52] U.S. Cl. .................................. 123/479; 123/494; 73/118.2; 73/204.27
[58] Field of Search ............... 123/494, 479; 73/118.2, 73/204

[56] References Cited

U.S. PATENT DOCUMENTS

| | | | |
|---|---|---|---|
| 4,420,971 | 12/1983 | Rapps et al. | 73/118.2 |
| 4,450,815 | 5/1984 | Mouri | 123/479 |
| 4,462,251 | 7/1984 | Sumal | 73/118.2 |
| 4,565,091 | 1/1986 | Ito et al. | 73/204 |

FOREIGN PATENT DOCUMENTS 0162293 11/1985 European Pat. Off. .
3207394 9/1983 Fed. Rep. of Germany .
54-76182 6/1979 Japan .

OTHER PUBLICATIONS

Patent Abstracts of Japan, vol. 7, No. 223 (M-247)[1368], 4th Oct. 1983; & JP-A-58-117 326 (Nissan Jidosha K.K.) 12-07-1983.

Primary Examiner—Andrew M. Dolinar
Attorney, Agent, or Firm—Oblon, Fisher, Spivak, McClelland, & Maier

[57] ABSTRACT

A fuel control apparatus comprises a hot-wire type intake air quantity sensor disposed in an air intake passage for an internal combustion engine to detect the quantity of air passing therethrough, a burn-off control section for heating a hot wire at a temperature higher than a temperature in the normal operation, after the engine has been stopped, so as to burn off a deposit on the hot wire, wherein the operation of the burn-off control section is stopped when an output from the sensor exceeds a predetermined value. A signal indicative of a trouble in the sensor can be generated.

5 Claims, 7 Drawing Sheets

FUEL CONTROL APPARATUS

BACKGROUND OF THE INVENTION

The present invention relates to a fuel control apparatus for an internal combustion engine. More particularly, it relates to an improved system for burning at a high temperature a deposit on the surface of a hot-wire type intake air quantity sensor used for the fuel control apparatus.

The characteristics of hot-wire type intake air quantity sensors change depending on substances deposited on the surface of the sensors. Deposition of the substances causes an error in the quantity of fuel to be supplied to an engine, whereby there arise problems of deterioration of the exhaust gas and reduction in operational performance. To cope with the problems, the hot wire has been heretofore heated at a temperature higher than a temperature in the normal operation of the engine after the engine has been stopped to thereby burn off the deposit. A method of burning-off of the deposit is disclosed, for instance, in Japanese Unexamined patent publication No. 76182/1979.

It is revealed from experiments that temperature for heating the hot wire should be about 1000° C. in order to obtain an effective burning-off operation. However, when the hot wire is heated at 1000° C., a fuel-air mixture is possibly fired. The firing of the fuel-air mixture is inconvenient for the operation of the intake air quantity sensor disposed in an intake passage for a gasoline engine.

Heretofore, in order to avoid the firing of the fuel-air mixture, the burning-off operations have been carried out only when the temperature of the intake passage and the revolution of the engine satisfy predetermined conditions during its operation and the fuel-air mixture exessively supplied to the intake passage during warming-up operations for the engine is sufficiently scavenged.

Alternatively, the burning-off operations have been carried out before the fuel-air mixture reversely flowing from a fuel supplying portion reaches the intake air quantity sensor and after the engine has been stopped. The reversing time of the mixture is obtained by experiments.

However, even when the above-mentioned conditions are satisfied, there sometimes remains gasoline around the intake air quantity sensor, and the firing of gasoline has happened due to a reaction in the burning-off. Thus, it has been found that the burning-off condition couldn't provide a good result.

Further, an erroneous operation of an electronic control unit or the intake air quantity sensor which results from a reduction of voltage in a circuit system including the electronic control unit and the sensor sometimes causes the burning-off while gosoline is supplied to thereby fire the gasoline.

SUMMARY OF THE INVENTION

It is an object of the present invention to provide a fuel control apparatus eliminating possibility of an undesired firing of gasoline.

The present invention provides a fuel control apparatus for calculating the quantity of fuel required for operating an internal combustion engine based on an output of a hot-wire type intake air quantity sensor disposed in an air intake passage for the internal combustion engine and supplying the optimum amount of the fuel to the engine by controlling a fuel control valve in accordance with the calculated value, wherein the fuel control apparatus comprises a burn-off control section for heating the hot wire of the sensor at a temperature higher than a temperature in the normal operation, after the engine has been stopped, so as to burn off a deposit on the hot wire, and means for stopping the operation of the burn-off control section when an output from the sensor exceeds a predetermined value and for outputting a signal indicative of a trouble in the sensor.

Further, the present invention provides a fuel control apparatus for calculating the quantity of fuel required for operating an internal combustion engine based on an output of a hot-wire type intake air quantity sensor disposed in an air intake passage for the internal combustion engine and supplying the optimum amount of the fuel to the engine by controlling a fuel control valve in accordance with the calculated value, wherein the fuel control apparatus comprises a burn-off control section for heating the hot wire at a temperature higher than a temperature in the normal operation, after the engine has been stopped, so as to burn off a deposit on the hot wire, and means for stopping the operation of the burn-off control section by detecting the reduction of voltage in the circuit system.

BRIEF DESCRIPTION OF THE DRAWINGS

In the drawings:

FIG. 2a is a flow chart showing the operation of the electronic control unit as shown in FIG. 2;

DETAILED DESCRIPTION OF THE PREFERRED EMBODIMENT

Preferred embodiments of the fuel control apparatus of the present invention will be described with reference to the drawings.

Figure 1:
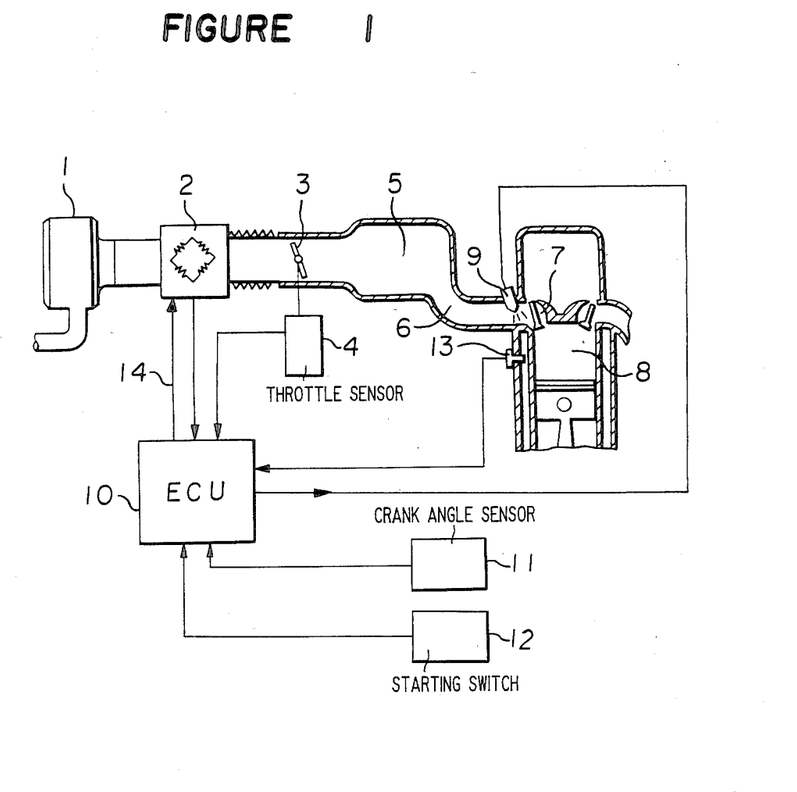
FIG. 1 is a diagram showing an embodiment of the fuel control apparatus according to the present invention.

FIG. 1 is a diagram showing the construction of the fuel injection controlling apparatus of the present invention. In FIG. 1, a reference numeral 1 designates an air cleaner and air passed through the air cleaner is supplied to a cylinder 8 through a surge tank 5 and an intake manifold 6. During supply of the air, the quantity of the air is detected by a hot-wire type intake air quantity sensor 2 (hereinbelow, referred to as an AFS). The quantity of the intake air is controlled by a throttle valve 3 which is provided at the inlet portion of a surge tank 5. A throttle sensor 4 operable in association with the throttle valve 3 generates a voltage signal depending on the degree of opening of the throttle valve 3, the output signal of the throttle valve 3 is supplied to an electronic control unit 10 (hereinbelow, referred to as an ECU). A numeral 7 designates an inlet valve driven by a cam (not shown).

A fuel control valve 9 (hereinbelow, referred to as an injecter) is provided for each of the cylinders 8. In FIG. 1, only one cylinder 8 is shown for simplification of the drawings although a plurality of the cylinders are in fact provided in the engine. The ECU controls an amount of the fuel injected from the injector 9 at a predetermined air-fuel ratio with respect to the quantity of air sucked to each of the cylinders 8. The ECU 10 determines the fuel quantity to be injected on the basis of each signal from the AFS 2, a crank angle sensor 11, a starting switch 12, a temperature sensor 13 for detecting the temperature of cooling water for the engine and a throttle sensor 4, and controls the pulse width for feeding the fuel so that the fuel is intermittently injected from the injector 9 in synchronism with the signal of the crank angle sensor 11. The ECU 10 generates a burning-off control signal 14 when conditions for the burning-off are all satisfied. The construction and function related to control of the burning-off of the AFS are well known, therefore description is omitted.

Figure 2:
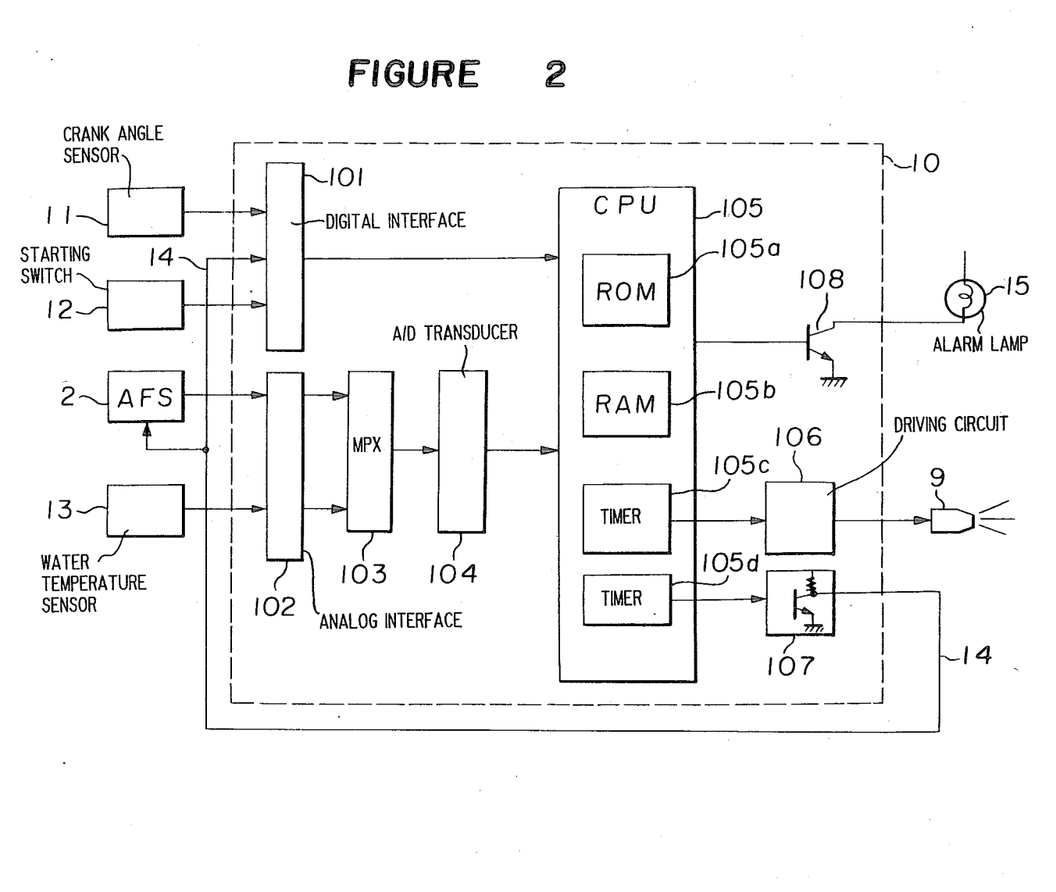
FIG. 2 is a block diagram showing an embodiment of the electronic control unit used for the fuel control apparatus shown in FIG. 1.

FIG. 2 is a block diagram showing an internal structure of the ECU 10. In FIG. 2, a reference numeral 101 designates an interface circuit for inputting digital values from the crank angle sensor 11 and the starting switch 12.

An output signal from the interface circuit 101 is supplied to a central processing unit 105 (hereinbelow, referred to as a CPU).

An analogue interface circuit 102 receives each signal from the AFS 2 and the water temperature sensor 13 and outputs an output signal to a multiplexer 103. An analogue signal from the multiplexer 103 is fed to an analogue-digital (A/D) transducer 104 in which the analogue signal is converted into a digital signal to be supplied to the CPU 105.

The CPU 105 includes an ROM 105a, an RAM 105b and timers 105c and 105d. The CPU calculates the pulse width for actuating the injector according to a program stored in the ROM 105a on the basis of the signals from the interface circuit 101 and the A/D transducer 104, and outputs a pulse having a predetermined time width through the timer 105c. A driving circuit 106 amplifies the pulse signal to drive the injector 9 which injects fuel to the cylinder 8 at the given time width. A system for controlling the quantity of the fuel is known, and therefore description is omitted.

The timer 105d is adapted to produce a burning-off pulse signal, which is amplified in a driving circuit 107 to be supplied as a burning-off signal 14 to the AFS 2.

FIG. 2a is a flow chart for illustrating the operation of the AFS 2 of the fuel control apparatus having the construction as above-mentioned in the case that an output from the AFS 2 becomes abnormal.

Firstly, determination is made as to whether or not the AFS 2 is normally operated at Step S101. If NO, determination is made at Step S102 as to whether or not the output of the AFS 2 is in the range between the smallest value Vmim 1 corresponding to the smallest quantity of the intake air to the engine and the greatest value Vmax 1 corrsponding to the greatest quantity of the intake air. If the output of the AFS 2 is out of the range, temperature control for the hot wire of the AFS 2 is regarded as being faulty, and a first fault flag is set at Step S103.

If the burning-off operation is carried out at Step S101, then, Step S104 is taken where determination is made as to whether or not the output of the AFS 2 in a voltage range corresponding to the burning-off temperature. If the output voltage is higher than the upper limit voltage Vmax 2 or lower the lower limit voltage Vmin 2, then temperature control for the burning-off operation is regarded as being faulty, and a second faulty flag is set at Step S105. That is, when the voltage is abnormally high, there is erroneous temperature control, and on the other hand, when the voltage is abnormally low, an abnormally high temperature is resulted by the reaction of gasoline-air mixture caused by the burning-off.

At Step S106, determination is made as to whether or not the first flag or the second flag is set. If either of the flags is set, then a burning-off prohibition flag is set at Step S107 to stop execution of the burning-off or to prevent the hot wire from being abnormally heated. At the same time, a signal indicative of a fault is outputted at Step S108, and the alarm lamp 15 is operated through the transistor 108 of the ECU 10.

Thus, when the above-mentioned conditions are found, execution of the burning-off is stopped or prohibited to prevent the hot wire from being abnormally heated. At the same time, the ECU outputs a signal indicative of a fault through the output transisor 108 to operate the alarm lamp 15.

Thus, there is no posibility of melt-breaking of the hot wire and the firing of gasoline when an abnormal output is generated from the AFS because the operation of the burn-off control section is stopped. Further, since the judgement of fault is made by detecting the output of the AFS, a highly reliable fuel control apparatus can be obtained at a low manufacturing cost.

A second embodiment of the present invention will be described with reference to the drawings. The general construction of the fuel control apparatus according to the second embodiment is the same as that in FIG. 1. The inner construction of the ECU 10 used for the fuel control apparatus is substantially the same as that in FIG. 3 except that the burning-off pulse generated from the timer 105d is amplified in the driving circuit 107 and is supplied only to the AFS 2 as a burning-off signal. Accordingly, the same reference numerals designate the same or corresponding parts, and therefore, description of these parts is omitted.

Figure 3:
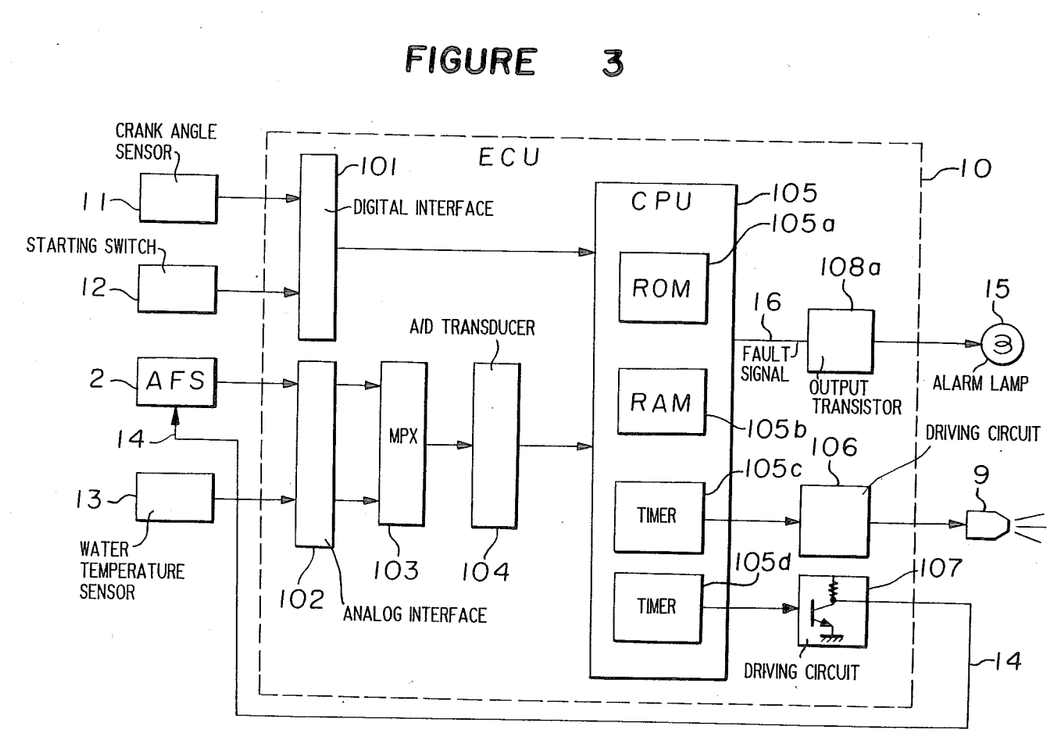
FIG. 3 is a block diagram showing a second embodiment of the electronic control unit used for the fuel control apparatus shown in FIG. 1.

In FIG. 3, a reference numeral 108a designates a fault signal generating circuit. The circuit 108a amplifies a fault signal 16 outputted from the CPU 105 and drives a fault displaying means such as the alarm lamp 15.

Description will be made as to generation of the fault signal 16 with reference to FIGS. 4 and 5.

Figure 4A:
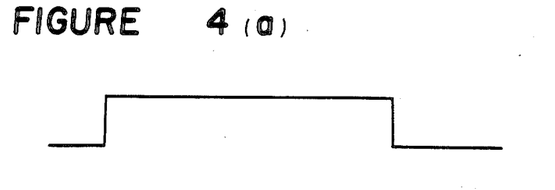
FIGS. 4(a) and 4(b) are diagrams showing the waveform of an output voltage of the AFS in burning-off operation.
Figure 4B:
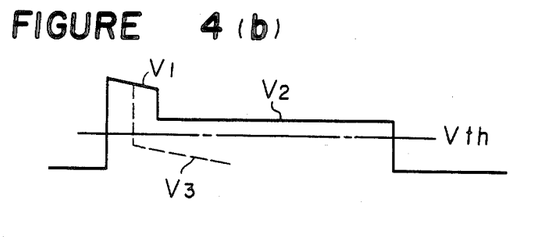
Figure 5:
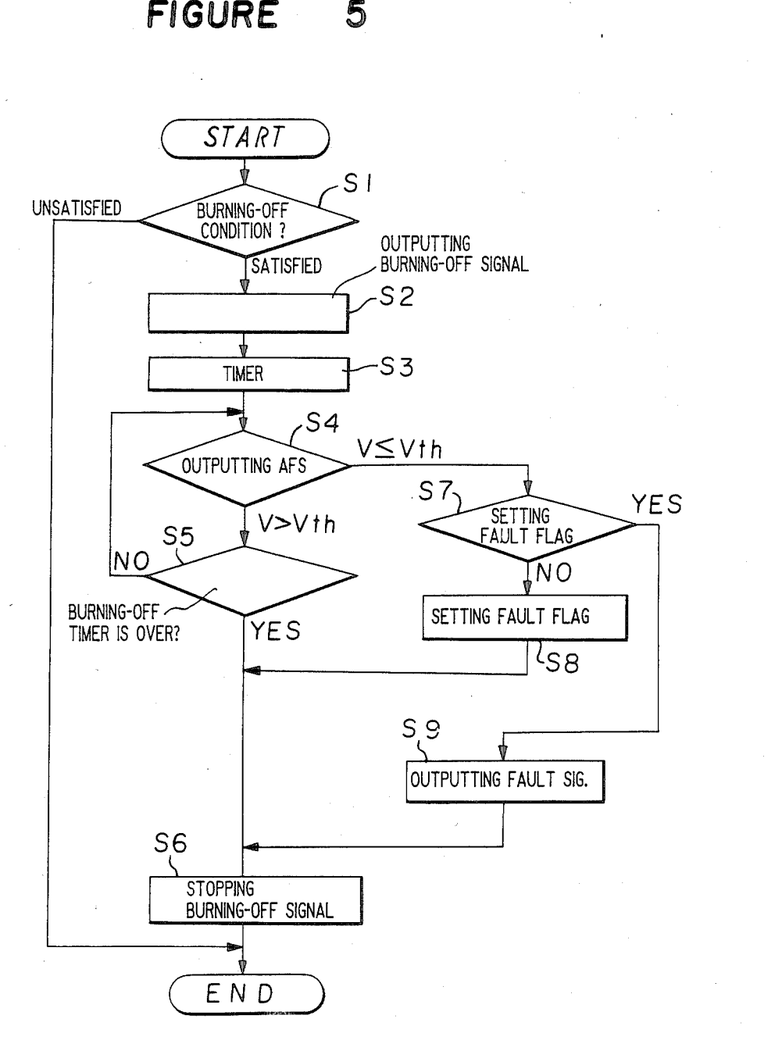
FIG. 5 is a flow chart showing an example of execution of a program for operating the fuel control apparatus according to the second embodiment of the present invention.

FIG. 4(a) shows the waveform of the burning-off signal 14 and FIG. 4(b) shows the waveform of the output voltage of the AFS when the AFS 2 is subjected to the burning-off operation by receiving the burning-off signal 14. In FIG. 4(b), a solid line indicates the output of the AFS 2 in the normal burning-off operation, in which the total voltage V1 is applied until the temperature of the hot wire of the AFS 2 reaches a predetermined level from the initiation of the burning-off operation, and a lower voltage V2 is applied to maintain a predetermined temperature after the temperature of the hot wire reaches the predetermined temperature level. On the other hand, there appears fairly different waveform as shown by a broken line if the gasoline remains around the hot wire. In this case, the output of the AFS reduces to a voltage level V3. The reason is that when an oxidative reaction of the gasoline occurs on the surface of the hot wire, the hot wire is heated by the heat of reaction, so that the hot wire is kept at a given temperature even though electric energy for heating is cut off to the hot wire by the instruction from the burn-off control section. If such condition continues, the oxidative reaction progresses and finally, the firing of gasoline occurs and the melt-breaking of the hot wire are resulted.

In the embodiment of the present invention, the output V of the AFS is compared with a predetermined voltage level Vth during the burning-off operation, and when the output voltage V is lower than the predetermined voltage level Vth, the burning-off operation is stopped to prevent the firing of gasoline and to generate the fault signal 16.

A program as above-mentioned will be described with reference to a flow chart in FIG. 5.

At Step 1, determination is made as to whether or not a burning-off condition is satisfied. If yes, the burning-off signal is generated at Step S2. At Step S3, it takes some amount of a time for stand-by before the AFS 2 is operated. Then, the output of the AFS 2 is judged at Step S4. When V>Vth, the sequential operation goes to Step S5, at which determination is made as to whether or not a time determined by a burning-off timer is over. If not, the operation is returned to Step S4 to repeat the judgement of the output of the AFS. If the time determined by the burning-off timer is over, the burning-off signal is stopped at Step S6 and the program is finished.

If the burning-off condition is not satisfied at Step S1, the program is finished without any controlling operations as described above.

If V≦Vth at Step S4, determination is made as to whether or not a fault flag is already set at Step 7. If the fault flag is not set, it is set at Step S8, and sequential operation goes to Step S6 at which the burning-off is stopped. A memory for the fault flag is preferably of a non-volatile type.

If the fault flag is set at Step S7, then the fault signal is generated at Step S9 to operate the alarm lamp and at the same time the burning-off signal is stopped at Step S6.

It is noted that in the second embodiment of the present invention, no fault signal is generated when the burning-off signal is stopped at the first time, in consideration that the gasoline may remain around the AFS even though the burning-off condition is satisfied and all of the parts are normally operated. If the gasoline exists around the AFS, the oxidative reaction takes place by the burning-off operation. When the stop of the burning-off signal frequently occurs, there is a great posibility that a fault occurs in a fuel supplying system (e.g. gasoline leaks from the injector 9). In this embodiment, the fault signal is generated when the stop of the burning-off occurs twice.

The fuel control apparatus of the second embodiment is effectively operated in the case that there is a fault in the driving circuit 107, the transmission line for the burning-off signal 14 and the AFS 2. Namely, when the burning-off operation is not normally operated due to the fault in these devices, the output V of the AFS becomes lower than the predetermined voltage level Vth, whereby a fault signal is generated and the sign of the fault is displayed.

Thus, in the second embodiment of the present invention, the burning-off is stopped by detecting presence of gasoline based on the output voltage of the AFS in the burning-off operation. Accordingly, there is no posibility of the firing of the gasoline by the burning-off operation. Further, when the stop of the burning-off operation subsequently occurs, the sign of fault is provided. Accordingly, the position of fault can be easily found and repairing of the mulfunctioning part can be easy.

Figure 6:
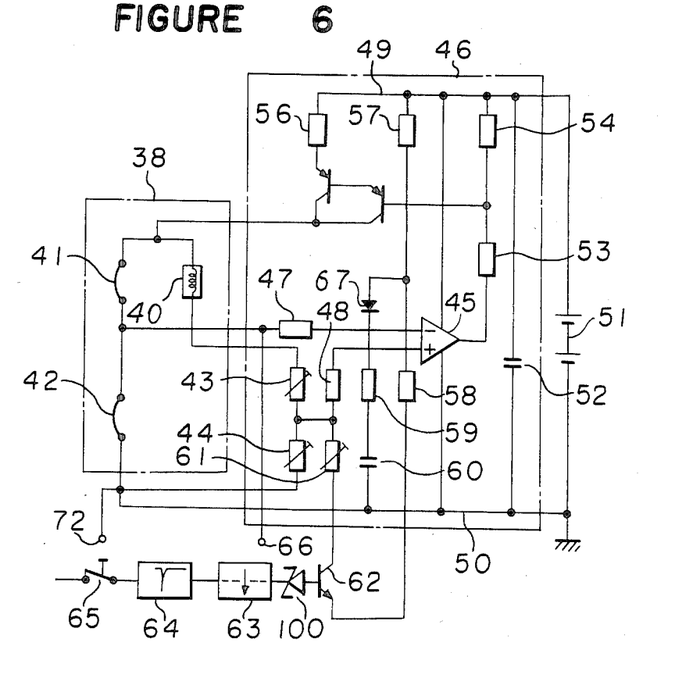
FIG. 6 is a circuit diagram of an embodiment of the fuel control apparatus of the present invention.

A third embodiment of the fuel control apparatus according to the present invention will be described with reference to FIG. 6. In FIG. 6, a block indicated by a reference numeral 38 designates an intake air passage. In the intake air passage 38, resistors 40 to 42 which constitute the AFS 2 are arranged, and the connecting point between the resistors 40 and 41 is connected to the output terminal of a Darlington circuit 55. The other end of the resistor 40 is connected to a feeder line 50 through the resistors 43, 44. The other end of the resistor 41 is connected to the feeder line 50 through the resistor 42. The feeder line 50 is connected to the negative electrode side of a d.c. power source 51, the negative electrode being grounded.

The resistor 40 is a temperature-depending resistor for forming a reference signal. The resistor 41 is a temperature-depending resistor for measuring, the quantity of air. The resistor 42 is not dependent on temperature. The resistors 40 to 42 and resistors 43, 44 constitute a bridge circuit. A controlling amplifier 45, which is an element of a controlling device 46, is in the diagonal line of the bridge circuit. The reverse input terminal of the controlling amplifier 45 is connected to the connecting point between the resistors 41 and 42 through the input resistor 47.

The non-reverse input terminal of the controlling amplifier 45 is connected to the connecting point between the resistors 43 and 44 through an input resistor 48. The controlling amplifier 45 is connected to the d.c. power source 51 through on one hand a feeder line 49 and on the other hand through the feeder line 50. The feeder line 49 is connected to the positive polarity of the d.c. voltage source 51. A smoothing capacitor 52 is connected in parallel to the d.c. voltage source 51.

The output terminal of the controlling amplifier 45 is connected to the feeder line 49 through the resistors 53, 54 which constitute a voltage dividing circuit for the Darlington circuit 55.

The Darlington circuit 55 constitutes an electric current source controllable by voltage so as to supply a current to the bridge circuit. A voltage dividing circuit consisting of resistors 57, 58 is connected between the feeder lines 49 and 50. The connecting point between the resistor 57 and a resistor 58 is connected to the reverse input terminal of the controlling amplifier 45 through a diode 67.

The reverse input terminal of the controlling amplifier 45 is connected to the feeder line 50 through a resistor 59 and a capacitor 60. The resistor 59 and capacitor 60 are adapted to conform the frequency of the controlling device 46 to the time characteristic in the resistance of the temperature-depending resistor.

The connecting point between the resistors 43, 44 is connected to the collector of a switching transistor 62 through a resistor 61. The emitter of the transistor 62 is connected to the feeder line 50. The base of the transistor is connected to the output terminal of a monostable multivibrator 63 through a voltage regulator diode 100 as a voltage detecting means. The monostable multivibrator 63 is triggered by a signal from an ignition switch 65 of the ignition device for an internal combustion engine through a direvative element 64. A terminal 66 is connected to the connecting point between the resistors 41 and 42 and a terminal 72 is connected to the feeder line 50.

The operation of the third embodiment of the present invention will be described. When a current having a predetermined intensity is supplied to the temperature-depending resistor 41, it is heated at a normal operational temperature. The resistance of the temperature-depending resistor 40 corresponds to the temperature of the intake air. Accordingly, the temperature of the intake air is used as a reference signal for controlling the current for heating the air quantity measuring device. The temperature-depending resistor 41 is cooled in proportion to an amount of the intake air passing around the resistor 41. When the resistor 41 is cooled, unbalanced condition appears in the bridge circuit. To return the bridge circuit to the balanced condition, a current flowing in the bridge circuit is increased by the controlling amplifier 45 through the current source formed by the resistor 56 controlled by voltage, the Darlington circuit 55 and the resistors 53, 54. Accordingly, the resistance of the temperature-depending resistor 41 is maintained at approximately constant value. Thus, the current flowing in the bridge circuit indicates the quantity of intake air passing around the resistor 41, whereby a signal corresponding to the intake air quantity can be obtained from the terminals 56, 72.

The resistors 57, 58 and the diode 67 constituting the voltage dividing circuit facilitates starting of the operation of the controlling device 46, namely, the voltage of about 0.5 volts is applied to the reverse input terminal of the controlling amplifier 45 by the resistors 57, 58 and the diode 67 when the controlling device 46 is actuated, whereby the controlling device 46 starts its operation.

On the other hand, in the normal operation, the voltage at the reverse input terminal of the controlling amplifier 45 is far greater than an initial voltage when the controlling device 46 is to be started. Accordingly, the diode 67 is in non-conductive state, and the resistors 57, 58 forming the voltage dividing circuit does not influence controlling operation of the controlling device 46.

A current flowing in the temperature-depending resistor 40 is increased at a predetermined measuring cycle to remove a deposit on the surface of the temperature-depending resistor 41. In this case, for instance, the measuring cycle can be determined with respect to a predetermined time of operation for operating the internal combustion engine. Particularly, it was found to be effective if the resistor 40 is heated at every interruption of the ignition device of the engine.

In the embodiment shown in FIG. 6, the resistor 40 is heated at every interruption of the ignition switch 65. The signal produced when the ignition switch 65 is interrupted is differentiated by the derivative element 64, and the monostable multivibrator 63 is set to be in a monostable condition. In this case, when the output of the vibrator 63 is higher than the break-over voltage of the voltage regulator diode 100, the switching transistor 62 becomes conductive while the monostable multivibrator 63 is set in the monostable condition, whereby the resistor 61 is connected in parallel to the resistor 44. Accordingly, the bridge circuit reaches an extremely inbalanced condition, and the current in the bridge circuit is increased by the controlling amplifier 45 to compensate for such inbalanced condition.

The resistor 41 is heated at a temperature higher than a temperature in the normal operation by a current increased when the monostable multivibrator 53 is in the monostable state, whereby the deposit on the resistor 41 is subjected to the burning-off operation.

When the voltage of the d.c. voltage source 51 is reduced, he voltage of the signal from the ignition switch 65 is also reduced, and hence, the output of the derivative element 64 and the monostable multivibrator 63 are also reduced depending on the voltage reduction of the voltage source 51. When the output of the monostable multivibrator 63 is lower than the break-over voltage of the voltage regulator diode 100, the diode 100 is in off state and the switching transistor 62 does not become conductive. Accordingly, there is no inbalanced condition in the bridge circuit, hence, a large current does no flow to the resistor 41. Thus, execution of the burning-off operation is avoided.

Thus, on detecting a low voltage in the circuit system, the burning-off operation is prohibited. Accordingly, erroneous operations of the controlling device 46 and the AFS are prevented, and the firing of gasoline is eliminated.

Figure 7:
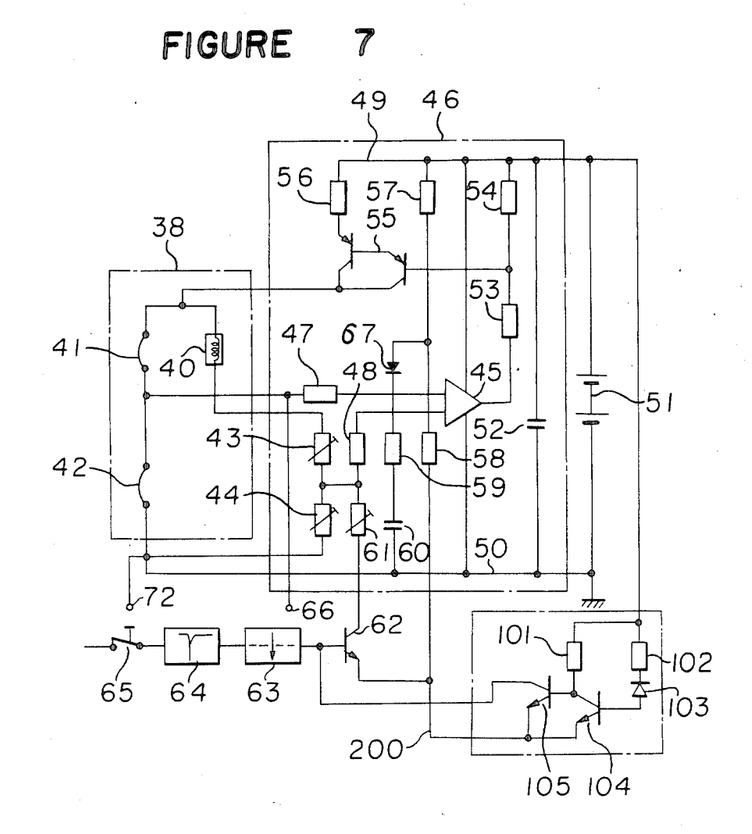
FIG. 7 is a circuit diagram of another embodiment of the present invention.

FIG. 7 is a circuit diagram of a modification of the third embodiment shown in FIG. 6. In the embodiment shown in FIG. 7, a voltage detecting circuit is used as a voltage detecting means instead of the voltage regulator diode 100.

In FIG. 7, the output terminal of the monostable multivibrator 63 is directly connected to the base of the switching transistor 62 as well as the collector of the transistor 105. The transistor 105, a transistor 104, resistors 101, 102 and a voltage regulator diode 103 constitute the voltage detecting circuit 200. The emitters of the transistors 104, 105 are connected to the emitter of the switching transistor 62. The base of the transistor 104 is connected to the feeder line 49 through the voltage regulator diode 103 and the resistor 102. The connecting point of the collector of the transistor 104 and the base of the transistor 105 is connected to the feeder line 49 through the resistor 101.

Thus, by providing the voltage detecting circuit 200, when the voltage of the d.c. voltage source 51 is reduced, and a voltage applied to the voltage regulator diode 103 is lower than the break-over voltage, the diode 103 is turned off, hence, the transistor 104 is also turned off, while the transistor 105 is turned on. When the transistor 105 is turned on, the potential between the emitter and the collector becomes the ground potential, and accordingly, the base of the switching transistor 62 is grounded. Thus, the bridge circuit is balanced as in the embodiment shown in FIG. 6 to thereby prevent the burning-off operation.

The voltage regulator diode 100 in FIG. 6 and the voltage detecting circuit 200 in FIG. 7 may be provided in the AFS or the ECU (controlling device 46).

In the embodiments shown in FIGS. 6 and 7, when the voltage detecting means detects a low voltage in the circuit system, control of the burning-off is stopped. Accordingly, there is no risk of burning-off even when erroneous operation of the ECU or the AFS takes place owing to the low voltage in the circuit system, hence, the firing of gasoline is prevented.

We claim:
1. A fuel control apparatus for calculating the quantity of fuel required for operating an internal combus- tion engine based on an output of a hot-wire type intake air quantity sensor disposed in an air intake passage for the internal combustion engine and supplying the optimum amount of the fuel to the engine by controlling a fuel control valve in accordance with the calculated value, characterized in that said fuel control apparatus comprises a burn-off control section for heating the hot wire of said sensor at a temperature high than a temperature in the normal operation, after said engine has been stopped, so as to burn off a deposit on said hot wire, means for stopping the operation of said burn-off control section when an output from said sensor crosses a predetermined value and means for outputting a signal indicative of a trouble in said sensor upon reaching a predetermined number of the stops of operation which exceeds one.

2. The fuel control apparatus according to claim 1, wherein said signal generating means is so adapted as to store a history on the stop of operation of said burn-off control section.

3. A fuel control apparatus for calculating the quantity of fuel required for operating an internal combustion engine based on an output of a hot-wire type intake air quantity sensor disposed in an air intake passage for the internal combustion engine and supplying the optimum amount of the fuel to the engine by controlling a fuel control valve in accordance with the calculated value, characterized in that said fuel control apparatus comprises a burn-off control section for heating the hot wire at a temperature higher than a temperature in the normal operation, after said engine has been stopped, so as to burn off a deposit on said hot wire, means for stopping the operation of said burn-off control section by detecting the reduction of voltage in the circuit system and means for outputting a signal indicative of a trouble in said sensor when reaching a predetermined number of the stops of operation which exceeds one.

4. The fuel control apparatus according to claim 3, wherein said means for stopping the operation of said burn-off control section comprises a first means to detect the voltage of said circuit system and a second means for prohibiting the burn-off operation when the voltage of said circuit system is lower than a predetermined level.

5. The fuel control apparatus according to claim 4, wherein said first means is a bridge circuit including said hot-wire type intake air quantity sensor and said second means comprises a voltage regulating element and a switching element.

* * * * *